Nov. 17, 1936.  M. DWORK  2,061,025
JACKING ATTACHMENT
Filed May 3, 1935  2 Sheets-Sheet 1
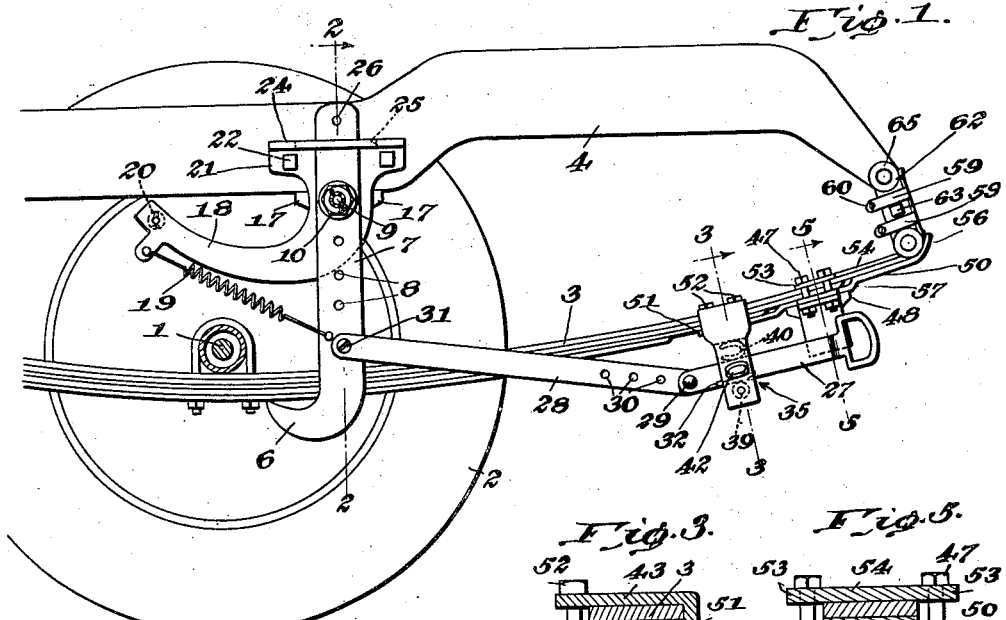
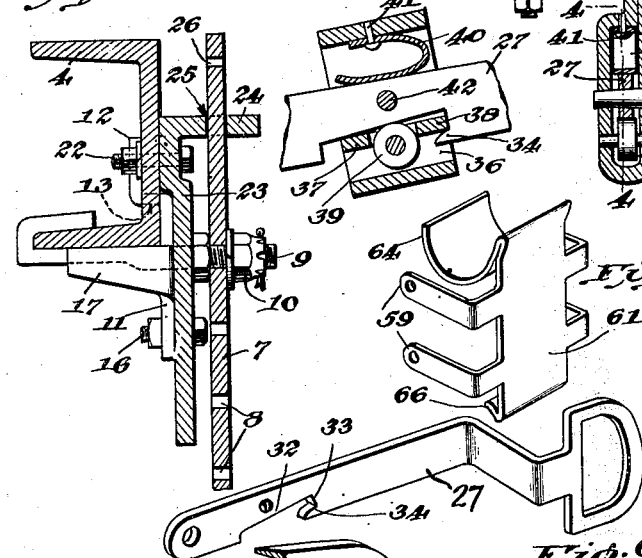
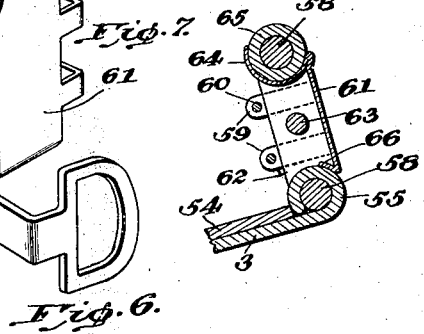
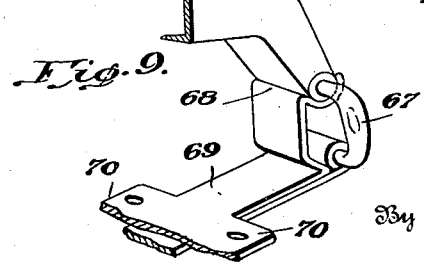
Inventor
Max Dwork,
By Munn, Anderson & Liddy
Attorneys

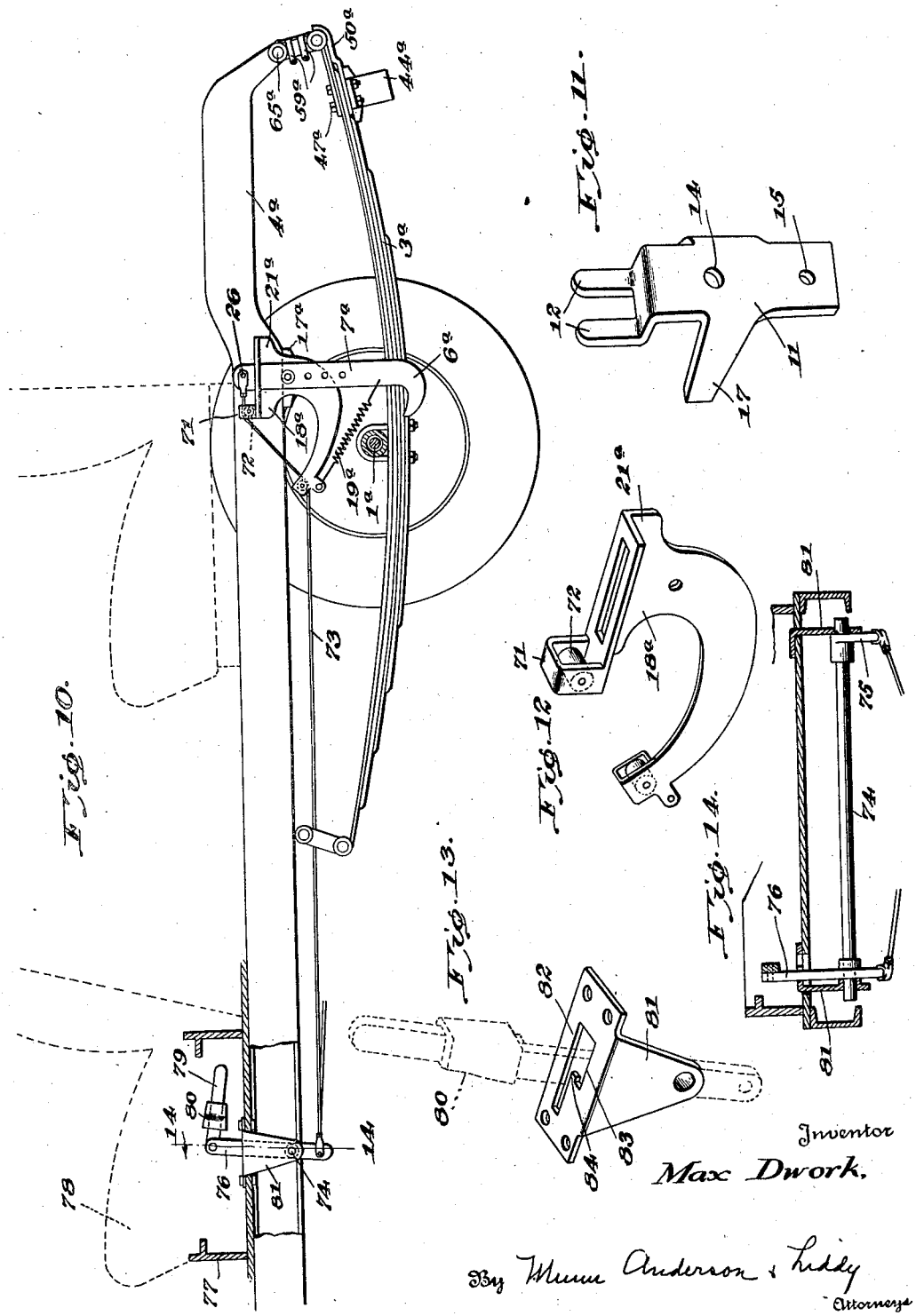

Patented Nov. 17, 1936

2,061,025

UNITED STATES PATENT OFFICE 2,061,025

JACKING ATTACHMENT

Max Dwork, Brooklyn, N. Y.

Application May 3, 1935, Serial No. 19,742

8 Claims. (Cl. 280—150)

This invention relates to improvements in jacking attachments in the class of land vehicles, attachments, and its objects are as follow:

First, to provide a jacking attachment which is intended especially for use on automobiles, although it is not confined to that use, its outstanding purposes being to facilitate jacking up the chassis, limiting the sag of the rear springs, and generally improving the jacking attachments of Max Dwork disclosed in Patent #1,928,171 of September 26, 1933 and the co-pending patent application filed April 11, 1934, Serial #720,118, now Patent 2,003,502 of June 4, 1935.

Second, to reduce the linkage for actuating the swinging hook to a detent arm and a simple link, the adjacent rear spring being employed as the mount for a combined guide and coacting detent for said arm, the equivalent stiff leg of the co-pending application now being used chiefly as a spring and roller mount so as to avoid drilling extra holes in the chassis.

Third, to provide the rear spring with a simple, rigid socket to receive the head of the jack and prevent its slipping out of position.

In the drawings:—

Figure 1 is a cross section of the rear axle of an automobile, taken immediately inside of the left rear wheel (not shown) and showing the jacking attachment on the rear left side.

Figure 2 is a cross section taken on the line 2—2 of Figure 1, particularly illustrating the stiff leg, bracket and hook assemblage.

Figure 3 is a cross section taken on the line 3—3 of Figure 1, particularly illustrating the combined guide and coacting detent.

Figure 4 is a detail cross section taken on the line 4—4 of Figure 3, the detent arm being in the locked position.

Figure 5 is a cross section taken on the line 5—5 of Figure 1, illustrating the simple jack head socket.

Figure 6 is a perspective view of the detent arm.

Figure 7 is a perspective view of the stiff brace, particularly illustrating the means for adapting it to the shackle members.

Figure 8 is a cross section of the spring shackle construction, showing the stiff brace in position.

Figure 9 is a perspective view illustrating the adaptation of a modified form of the stiff brace to another shackle of the open type.

Figure 10 is a longitudinal sectional view of an automobile chassis, illustrating an arrangement for actuating the pivoted hook from a lever which is accessible from the compartment under the front seat.

Figure 11 is a perspective view of the brackets referred to in the description of Figure 2.

Figure 12 is a perspective view of the stiff leg also referred to in the description of Figure 2, this, however, being of the modified type shown in Figure 10.

Figure 13 is a perspective view of one of the jack shaft brackets.

Figure 14 is a cross section taken on the line 14—14 of Figure 10.

The instant jacking attachment is an improvement particularly on the jacking attachment disclosed in the co-pending application filed by Max Dwork April 11, 1934, Serial #720,118. The chief purpose of both the instant and allied inventions is to provide means for limiting the sag of the rear spring (herein chiefly referring to only one) of an automobile when jacking up the chassis at a place other than beneath the axle.

Such parts disclosed herein and which are common to the foregoing application and patent comprise the rear axle 1, rear right wheel 2, left spring 3, a portion 4 of the chassis and the hook 6. The shank 7 of the hook has a series of holes 8, a selected one of which receives the hook bolt 9 (Fig. 2). The hook 6 is held on the bolt by a nut 10, which nut aids in securing the stiff leg to the chassis portion 4.

A bracket 11 (Fig. 11) is interposed between the chassis portion 4 and the stiff leg, and in this instance the main purpose of the bracket is to reinforce the stiff leg. To this end it has a pair of offset pins 12 which are inserted in holes 13 in the side of the chassis 4. It has holes 14, 15, respectively containing the hook bolt 9 (Fig. 2) and a bolt 16 which secures the bracket and stiff leg together. The bracket has inwardly directed ears 17 which engage the nether side of the chassis portion and provide the desired reinforcement. These ears are the equivalents of the shoulder in the co-pending application in which said bracket is claimed.

From here on the description identifies the improvement. The stiff leg 18 is now chiefly used as the mount for one end of a coil spring 19 and of a roller 20. The other end of the spring 19 is connected with the hook shank 7, and its purpose is to draw the hook 6 toward the axle 1 into a catching position so as to limit the sag of the spring 3. However, the spring is prevented from doing this until the hook is released. The stiff leg has a head portion 21. This is shown secured at 22 to the chassis 4, there being an offset 23

(Fig. 2) in the head portion to make room for the interposed bracket 11. The stiff leg may be attached solely to the bracket as in the co-pending application, the securing means 22 showing mainly how the mounting of the assemblage can be strengthened.

A flange 24 standing off from the head portion 21 is slotted at 25 (Fig. 2) to contain the upper end of the hook shank 7. The walls of the slot provide a guide for the hook shank, tending to prevent any undesired lateral play of the hook shank on the bolt 9. That end of the shank above the flange has a hole 26.

Linkage by which the hook 6 is actuated, now consists of the detent arm 27 and a simple link 28. These two members have a pivotal connection 29. The link 28 has a series of holes 30 for a possible adjustment of the pivotal connection as when the attachment is applied to different makes of automobiles. The remaining end of the link 28 is pivoted at 31 to the hook shank 7. The arm 27 is cut at 32 (Fig. 6) or formed however else might be found convenient, to provide a detent notch 33 and point 34. Either the notch or the point can serve as part of the detent, and when the detent is in the locked position (Fig. 1) the hook 6 is held retracted against the tension of the spring 19. Upon desiring to let the spring move the hook into the catching position under the axle 1 the detent arm 27 is released from the locked position whereupon the spring accomplishes the purpose as will be clear.

The spring 3 is now used as the mount for a combined guide and coacting detent generally designated 35. This is formed to provide a passage 36 (Fig. 3), and it is in this passage that the arm 27 is guided in its back and forth movements. A plate 37 (Fig. 4) extends across the passage immediately beneath the arm 27, and one of its ends 38 which provides a shoulder is engaged either by the notch 33 or point 34, or by both, thereby providing the remainder of and the coacting part of the foregoing detent.

A roller 39 provides a support for the arm 27, and reduces the friction of its movement when the arm is shifted. A bowed spring 40 presses down on the arm and tends to keep it in contact with the roller. This is true whether the cut 32 or the normal underside of the arm are in contacting position. It is to be noted that the cut 32 is long enough (Fig. 4) to allow for the retraction of the detent point 34 from beneath the end 38. The spring 40 is secured at the top of the passage 36 by a rivet or equivalent means 41. In order to insure the retention of the arm 27 in the locked position, a tapered pin 42 (Fig. 3) is inserted in registering holes in the guide 35 and arm 27.

A flange 43, or its equivalent, is secured to the spring 3 so as to support the guide 35 in the desired pendent position. It is to be borne in mind that the member 35 is provided solely for the guidance and locking of the arm 27 of the linkage, and that the linkage is not actually connected to the guide 35 as it is to the stiff leg in the co-pending application.

A simple socket 44 (Figs. 1 and 5) is used for the purpose of the jack (not shown), the socket bottom 45 being roughened to further prevent slipping of the jack head when inserted. The socket is laterally flanged at 46 to receive the bolts 47 which secure the socket to the spring 3. The socket is further provided with lugs 48 at the front and back for the purpose of stabilization. These lugs bear directly against a plate 50.

This plate is known as a rack plate in Patent 1,964,625 of June 26, 1934 to Max Dwork, relating particularly to an adjustable jack socket. In the instant application said plate is mainly used as a reinforcement for the spring end, the forward extension 51 of the plate (Fig. 1) coacting with the flange 43 of the guide 35 in receiving the bolts 52 (Fig. 3) which secure the flange as previously stated.

The bolts 47 go through the plate 50 and through the ears 53 of a clamp plate 54. The rear end of the clamp plate is brought close up to one side of the spring knuckle 55 (Fig. 3). A curvature 56 on the rear end of the plate 50 is brought close to the other side of the spring knuckle, the two working together in preventing the socket 44 from slipping either forward or backward on the spring, it being further noted that the plate 50 has several offsets 57 in confronting positions with the ends of the spring leaves.

Provision is made of a stiff brace for transferring the lifting force applied to the socket 44 to the chassis 4, and to relieve the shackle bolts 58 (Fig. 8), especially the upper shackle bolt, of some of the strain in doing so. A brace for this purpose is claimed in Patent 1,964,625, but in the type of brace under present consideration, which type is claimed in a division of the instant application filed by Max Dwork June 28, 1935, Serial No. 28,970, use is made of pairs of lugs 59 (Fig. 7) through which to insert bolts 60 (Fig. 1) for fixedly attaching the brace plate 61 to the shackle members 62. These members comprise what is known as a closed shackle and consist of duplicate links which connect the ends of the spring and chassis by means of the bolts 58 mentioned.

The lugs 59 extend above and below the stay bolt 63 (Fig. 8) which customarily clamps the shackle members in position on the ends of the shackle bolts. Sometimes the threads either in the nut or on the end of the stay bolt become stripped, and in such event there is ordinarily nothing to prevent the shackle members from falling apart. One of the purposes of the brace plate 61 and its lugs 59 is to confine the shackle members and prevent their becoming loose or lost in the event of the stay bolt 63 coming out.

This brace plate has an integral saddle 64 which fits under the knuckle 65 (Fig. 8) of the chassis. The saddle and brace plate are very stiff, the two providing the stiff brace, mentioned before, which, for its other purpose, transfers the lifting power to the chassis. A curvature 66, of less extent than the saddle 64, bears on the spring knuckle 55.

Some spring shackles are of the open type as shown at 67 in Fig. 9. This shackle is of a U-shape. For the purposes of this type a stiff brace more on the order of the one disclosed in Patent 1,964,625 has been found preferable. This brace includes a saddle 68 to contain the knuckle of the chassis as shown in Fig. 9. This saddle is made part of a plate 69 which can be regarded as the equivalent of the clamp plate 54 in Fig. 1. This clamp plate has ears 70 which are for the same purpose as the ears 53 in Fig. 1.

From what has been stated it can be understood that so far the operation of the sag limiting means is accomplished by a person standing in the rear of the automobile. An alternative provision is made for accomplishing the operation from the front end of the automobile, more specifically from a position under the front seat. Most of the parts already described are used in modified Fig. 10, and inasmuch as the purposes and operation are identical the parts are identified with corresponding reference numerals having the exponent letter a, without necessarily repeating the description.

The head portion 21a of the stiff leg 18a is provided with a cage 71 (Fig. 12) which supports the pin of a roller 72. This roller provides one of the guides for a cable 73, equivalent to the link 28, or other flexible element which, after being attached to the hook shank 7a at the previously described hole 26 is directed over the roller 72, under the roller 20 and forwardly to a place of connection with a jack shaft 74. This place of connection comprises a short arm 75.

Mention was previously made of the description being confined largely to one jacking attachment. It will be understood that there will be at least two jacking attachments, one for each rear wheel. This is perhaps more apparent in Fig. 14, wherein the jack shaft 74 is shown as provided with two short arms 75, one for each of the cables 73.

A lever 76, equivalent to the arm 27, extends up from the jack shaft 74 to the interior of the front seat box 77. The lever is accessible upon removing the seat 78. In order that there will be sufficient leverage, the lever 76 has a pivoted extension 79 which, when straightened, can be rigidly coupled by a sleeve 80 which can either be slid down or will ride into position over the pivot by gravity (Fig. 13).

The shaft 74 is journaled on a pair of brackets 81. These are attached to the floor boards and extend downwardly. Neither these brackets nor the lever 76 are in the way of the seat box 77 which, customarily, is made adjustable. One of the brackets has an opening 82 (Fig. 13) for the lever 76. A notched side 83 of this opening provides a detent 84, equivalent to the detent means 33, 34, 38, for securing the lever in its rearward position. Upon disengaging the lever from the detent 84, the tension of the spring 19a will pull the hook 6a forwardly into a catching position. The cable 73 is always under tension of the spring, and it is the spring tension which keeps the lever 76 in the notch 83.

The operation is readily understood. The arrangement in Fig. 1 enables an operation of the sag limiting means from the rear of the automobile. The arrangement in Fig. 10 enables operation from a position near the front. Usually the jack and other tools are kept in the seat box, and upon removing the front seat for the purpose of getting the jack it becomes a matter of convenience for the operator to set the hook 6a in the catching position at the same time.

One of the distinctions between Figs. 1 and 10 is that according to the arrangement in Fig. 1 the two sag limiting means 6 are separately and independently operable, whereas according to Fig. 10 both sag limiting means 6a are simultaneously operable. However, the latter mode of operation is not necessarily adhered to because by simply dividing the jack shaft 74 and providing it with two levers 76 each of the sag limiting means of the form in Fig. 10 can be individually operated as in Fig. 1. Despite the difference of positions from which the sag limiting means in Figs. 1 and 10 are actuated, there is an identity of means insofar as the arm 27, lever 76, connecting link 28, cable 73 and detent means 33, 34, 38 and 84 are concerned, this as already suggested in the earlier description.

Prior to jacking up the frame on either one side or the other the sag limiting means 6, 6a will be brought into the catching position beneath the axle 1, 1a so as to catch the axle and limit the sag of the spring 3, 3a when jacking commences. The stiff brace 61, 64 (Figs. 1 and 8) transfers the lifting force from the spring to the chassis 4, 4a. The lugs 59 and bolts 60 give the brace the additional function of holding the shackle members 62 together in the event the stay bolt 63 becomes disabled. As to the form in Fig. 1, it is repeated that the guide 35 mainly guides the arm 27 of the actuating linkage. Its other purpose is to provide a coacting detent, the manner of interengagement of the arm and detent being plainly shown in Fig. 4.

I claim:—

1. In a jacking attachment which comprises a hook and means for pivotally mounting it on a chassis; linkage connected at one point with the hook for swinging the hook toward and from an axle, detent means incorporated in one part of the linkage, a combined guide and detent coacting shoulder, the guide containing said part of the linkage for guidance when swinging the hook and its shoulder coacting with the detent means to lock the linkage in one position, and means by which said guide is attached to an adjacent spring.

2. In a jacking attachment which comprises a hook and means for pivotally mounting it on a chassis; a link and means by which one of its ends is pivotally connected with the hook, a detent arm and means by which the other end of the link is pivotally connected with the arm, said arm having means constituting part of a detent, guide means containing the arm for guidance, and means by which the guide means is attached to a spring, said guide means having a detent shoulder with which the detent means of the arm is interlocked to hold the hook in a non-catching position beside an axle.

3. In a jacking attachment which comprises a hook and means for pivotally mounting it on a chassis; a link and means by which one end of it is pivotally connected with the hook, a detent arm and means by which the other end of the link is connected with the arm, guide means and means by which it is attached to a spring, said guide means having a passage in which the arm is contained for guidance, coacting detent means on the arm and guide means capable of being interlocked when the arm is moved to shift the hook to a non-catching position beside an axle, a roller carried by the guide means, and a spring to press the arm into contact with the roller.

4. In a jacking attachment which comprises a hook and means for pivotally mounting it on a chassis; linkage for actuating the hook, said linkage including an arm, guide means and means by which said guide means is attached to a spring, said guide means having a passage containing the arm for guidance when moving the arm to swing the hook, coacting detent means on the arm and guide means which are interlocked to hold the hook in a non-catching position beside an axle, and auxiliary locking means comprising a tapered pin and holes in the arm and guide means which register in the locking position to contain the pin.

5. In a jacking attachment which comprises a hook and means for pivotally mounting it on a chassis; linkage for actuating the hook, said linkage including an arm which has a cut formed to provide detent means, guide means and means by which the guide means is attached to a spring said guide means having a passage in which the arm is movable, and a plate on the guide means across the passage, one end of the plate constituting a detent to coact with the detent of the arm for establishing a locking position of the arm.

6. A jacking attachment comprising a hook, a stiff leg and means by which it is fixedly attached to a chassis, a pivot for the hook on the stiff leg, a spring which has its ends attached to the stiff leg and to the hook so as to draw the hook into a catching position beneath an axle, and means also attached to the hook for swinging the hook against the tension of the spring, said stiff leg including a head portion which has a flange with a slot containing a part of the hook for the guidance of the hook in its swinging movements.

7. A jacking attachment comprising a hook, a stiff leg and means by which it is attached to a chassis, a pivot for the hook on the stiff leg, said stiff leg including a head portion which has a flange with a slot containing a portion of the hook for guidance, a cage on the flange, said cage and the stiff leg supporting rollers, a spring having its ends attached to the stiff leg and hook, a cable attached at one end to the hook portion above the flange and being guided over the rollers, a lever to which the other end of the cable is attached for operation of the cable against the tension of the spring, and means by which the lever is movably supported, said means including a detent for holding the lever in a position to maintain the spring under tension.

8. In a vehicle which includes a chassis, floor boards, a seat box and a spring-supported axle; a jacking attachment comprising a hook and means by which it is pivotally mounted on the chassis adjacent to the axle, a lever, a connection between the lever and the hook so that when the lever is moved the hook is swung with respect to the axle in at least one direction, a bracket on which the lever is pivotally mounted, said bracket being attached to the floor boards within the confines of the seat box, a spring which has one end attached to the hook and is so anchored at its other end as to draw the hook into a catching position beneath the axle, and means in the bracket providing a detent by which the lever is detained against the tension of the spring to hold the hook in a non-catching position.

MAX DWORK.